United States Patent
Adler et al.

(10) Patent No.: US 9,313,203 B2
(45) Date of Patent: Apr. 12, 2016

(54) SYSTEMS AND METHODS FOR IDENTIFYING A SECURE APPLICATION WHEN CONNECTING TO A NETWORK

(71) Applicant: SYMANTEC CORPORATION, Mountain View, CA (US)

(72) Inventors: Michael Adler, Framingham, MA (US); Thomas Jeffrey Enderwick, La Jolla, CA (US); Robert Koeten, Menlo Park, CA (US); Nicolas Popp, Los Altos Hills, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 13/834,311

(22) Filed: Mar. 15, 2013

(65) Prior Publication Data

US 2014/0282821 A1   Sep. 18, 2014

(51) Int. Cl.
*G06F 21/00* (2013.01)
*H04L 29/06* (2006.01)
*G06F 21/44* (2013.01)
*G06F 21/62* (2013.01)

(52) U.S. Cl.
CPC ............... *H04L 63/10* (2013.01); *G06F 21/44* (2013.01); *G06F 21/62* (2013.01); *H04L 63/20* (2013.01)

(58) Field of Classification Search
CPC .... G06Q 20/32; G06Q 30/0267; H04L 29/06; H04L 9/3271; H04L 67/10; G06F 21/305; H04W 12/06; H02J 13/0079; G07C 5/008
USPC ........................................................ 726/1–10
See application file for complete search history.

(56) References Cited

U.S. PATENT DOCUMENTS

| 2009/0228967 | A1 | 9/2009 | Gbadegesin |
| 2011/0093941 | A1* | 4/2011 | Liu et al. ........................... 726/7 |
| 2011/0125655 | A1* | 5/2011 | Chiyo et al. ................... 705/310 |
| 2013/0133043 | A1* | 5/2013 | Barkie et al. ...................... 726/4 |

FOREIGN PATENT DOCUMENTS

DE          102011080467 A1    2/2013

OTHER PUBLICATIONS

International Search Report and Written Opinion for PCT Application No. PCT/US2014/02922 mailed Jun. 26, 2014.
Menezes, Alfred J. et al. "Chapter 12: Key Establishment Protocols", Handbook of Applied Cryptography, [CRC Press SEries on Discrete Mathematices and Its Applications], Oct. 1, 1996, pp. 489-541, CRC Press, Boca Raton, Florida, US.

* cited by examiner

*Primary Examiner* — Ghazal Shehni
(74) *Attorney, Agent, or Firm* — Wilmer Cutler Pickering Hale and Dorr LLP (57) ABSTRACT

A computer system receives, from a user device, a request to access a resource within a network of an organization and receives access credentials associated with an application, a user and the user device. The computer system identifies an application identifier, a user identifier and a device identifier and determines whether the combination of these identifiers satisfies an access policy. If the combination of application identifier, user identifier and device identifier satisfies the access policy, then the computer system grants the application access to the resource within the network of the organization.

20 Claims, 6 Drawing Sheets

SYSTEMS AND METHODS FOR IDENTIFYING A SECURE APPLICATION WHEN CONNECTING TO A NETWORK

FIELD

Embodiments of the invention relate to application authentication, and in particular to identifying a secure application when connecting to a network.

BACKGROUND

Users on mobile devices often desire to access information that exists on a secure network, such as a controlled or a corporate network, within a firewall. The firewall can have an access proxy, such as a gateway, that can provide a user with access to the secure network. Organizations may offer one or more cloud services to users over a network (e.g., the Internet). The cloud services may include computation, software, data access, storage services, contracted services that may or may not be secured through IP restrictions, etc. that physically reside elsewhere (e.g., another computer or the organizations data center) which users can access from company owned computers. For corporate network implementations, when employees bring their own device ('BYOD') to access the corporate network, the employee's device is typically prevented from accessing the corporate network.

SUMMARY

A system for accessing cloud resources is described. In one embodiment, an access proxy receives a request of an application to access a resource within a network of an organization. The application is running on a user device outside of the network of the organization. The access proxy further identifies a user identifier of a user of the application, a device identifier of the user device, and an application identifier of the application. The access proxy also determines whether a combination of the user identifier, the device identifier and the application identifier satisfies an access policy. The access proxy grants the application access to the resource within the network of the organization if the combination of the user identifier, the device identifier and the application identifier satisfies the access policy.

In one embodiment the resource is at least one of a private cloud resource or a public cloud resource. In one embodiment, the request of the application includes the user identifier, the device identifier, and the application identifier contained in an assertion signed by an application private key. The access proxy can further extract the user identifier, the device identifier, and the application identifier from the request using an application public key from an application provisioning service. In one embodiment, granting the application access to the resource within the network of the organization includes determining which cloud resources to make available to user device.

In another embodiment, the system further includes a user device that receives a user request to launch an application to access a cloud resource. The user device also can obtain access credentials for the application, the access credentials comprising a user identifier, a device identifier, and an application identifier. The user device can further send an access request that comprises the access credentials and an identifier of the cloud resource to an access proxy via a network. The user device can receive a response to the access request from the access proxy, the response indicating whether the access request has been granted or denied.

In one embodiment, determining whether the combination of the user identifier, the device identifier and the application identifier satisfies the access policy includes comparing the combination of the user identifier, the device identifier and the application identifier associated with the request to a list of valid combinations of user identifiers, device identifiers, and application identifiers. Obtaining access credentials can include providing a user interface to facilitate user input of at least one of the user identifier, the device identifier and the application identifier.

A method for accessing cloud resources is described. In one embodiment, a computer system, such as an access proxy, receives a request of an application to access a resource within a network of an organization. The application is running on a user device outside of the network of the organization. The access proxy can identify a user identifier of a user of the application, a device identifier of the user device, and an application identifier of the application. The access proxy can further determine whether a combination of the user identifier, the device identifier and the application identifier satisfies an access policy. The access proxy can also grant the application access to the resource within the network of the organization if the combination of the user identifier, the device identifier and the application identifier satisfies the access policy.

Further, a non-transitory computer-readable storage medium network for accessing cloud resources is described. An exemplary computer readable storage medium provides instructions, which when executed by a processor causes the processor to perform a method such as the exemplary methods discussed above.

BRIEF DESCRIPTION OF THE DRAWINGS

The present invention will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Embodiments of a method and apparatus are described for identifying a secure application when connecting to a network to access a cloud service or resource. In certain embodiments, an access proxy integrates access management and identity authentication using a combination of user identity, device identity and application identity. The access proxy can prevent access to the cloud resource from some applications on a user's personal device while allowing access to the same cloud resource from another application on the user's personal device.

Figure 1:
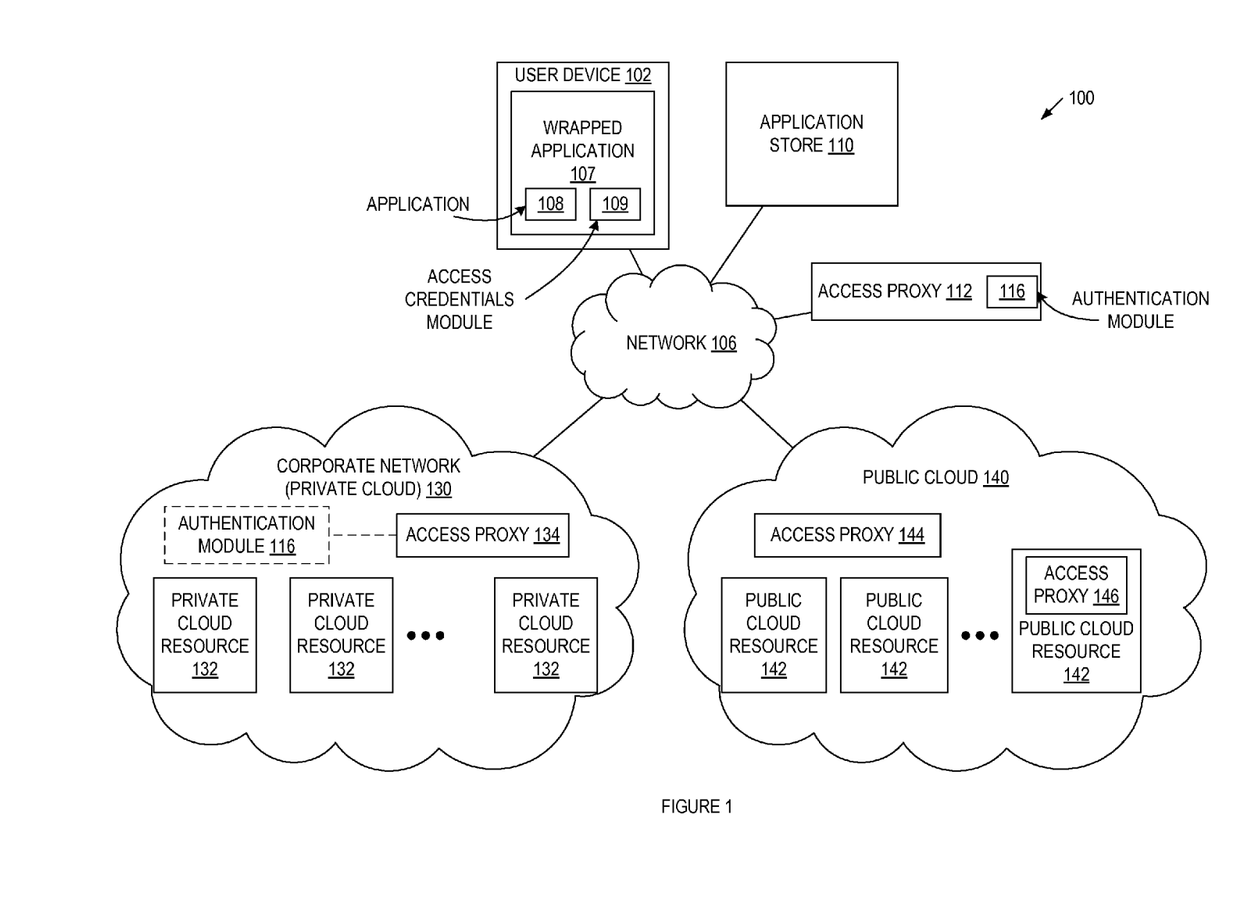
FIG. 1 is a block diagram of a sample network architecture, in which embodiments of the present invention may operate.

FIG. 1 is a block diagram of sample network architecture 100, in which embodiments of the present invention described herein may operate. The network architecture 100 may include corporate network (private cloud) 130, public cloud 140 (including services not managed by the corporation and included in private cloud 130), and user devices 102 capable of communicating with the corporate network 130 and public cloud 140 via a network 106. Network 106 may include, for example, a private network such as a local area network (LAN), a wide area network (WAN), a global area network (GAN) such as the Internet, or a combination of such networks, and may include a wired or wireless network.

Cloud computing (the 'cloud') may refer to the access of computing resources over a computer network. Cloud computing allows for a functional separation between the computing resources used and the physical machine where the user is working. Users may access the resources in the cloud (e.g., corporate network 130 or public cloud 140) using user devices. User devices can include managed user devices and unmanaged user devices. A managed user device refers to a user device (owned by a corporation or the user) over which the corporation can exercise some level of control. In particular, the corporation has control over what applications or programs can be installed and run on a managed user device. An unmanaged user device is a user device owned by the user that is not controlled by the corporation, such as an employee's home computer or personal cell phone. User device 102 shown in FIG. 1 represents an unmanaged portable device of the user such as a tablet computer, a smartphone, a personal digital assistant (PDA), a portable media player, a netbook, and the like.

The user can download various applications to the user device 102 from one or more application stores 110. Application store 110 can be managed by an application provisioning service that may be part of the corporate network 130 or public cloud 140, or any other network or entity. Application store 110 can include wrapped applications for download. The user can download a wrapped application 107 to the user device 102 from the application store 110. A wrapped application 107 includes an application (or 'app') 108 that is wrapped with a security layer that can enforce policy, authentication and encryption. Application 108 can be any type of application, executable, program, etc. Examples include: native apps (which can be coded using a 3rd-party framework), web clips, or shortcuts, secured web-apps (a "wrapped", chrome-less browser tied to one URL), "store pointers," (where the object being distributed is a deep link into the commercial application store client), and the like. Application wrapping is the addition of a policy-enforcement "wrap code" to an application 108 prior to the distribution of the application 108.

The wrapping of an application has multiple uses, including for example authentication. Inactivity timeout is configurable, and offline authentication can be permitted on an app-by-app basis. Online in-app authentication is independent of a particular protocol, but can leverage a local user/group store, (e.g., local Identity Provider (IdP), Identity Assertion Provider, etc.) or by connecting to an Active Directory (AD) using Lightweight Directory Access Protocol (LDAP). For example, a wrapped application 107 can require online authentication before a user is allowed to access the app 108. In another example, authentication includes checking whether the device's operating system has been modified or altered in a manner that may pose a security threat to the device or to other devices on the network, (e.g., by "rooting" or "jailbreaking" techniques) and denying an authentication for modified or altered devices.

The application provisioning service managing the application store 110 can only permit authorized users to access and browse available applications 107. In such a configuration, the application store 110 presents the user with a login screen where the user inputs their user credentials. The application provisioning service can validate the credentials or use another system or module to validate the credentials. If the user has provided valid credentials, application store 110 grants access to its wrapped application library. In another embodiment, the application provisioning service only permits authorized devices to access the application store. For this configuration, a request to access the application store 110 comes from a device. A user may enter the device identifier or the device identifier can be automatically added to a user request to access the application store 110. Similar to validating user credentials, if the device is validated, then it may access the application store 110.

In one embodiment, application store 110 is accessed through a downloadable client that is installed on user device 102. This downloadable application store client allows users to browse and select wrapped apps 107 from a set of apps to which they have access. Once an app 107 is selected, the application store client works with a server associated with application store 110 to install the app 107 on the device 102. A server associated with application store 110 maintains a database of apps 107 installed on devices, and also device-user association.

Corporate network 130 and public cloud 140 may each include a group of cloud resources and/or services 132,142 accessible to authorized user devices over network 106. Private cloud resources 132 may include, for example, an email service, a document management service, a customer relationship management (CRM) service, a video communication service, or some other cloud service. Select users may be afforded access to private cloud resources 132 in corporate network 130 using user devices 102 over network 106. Private cloud resources 132 can be encrypted.

Network architecture 100 may also be designed with security features to protect access to private resources and services and confidential information maintained by an organization. In one embodiment, the security may be implemented by a series of one or more access proxies (e.g., a cloud service access and information gateway) 112, 134, 144, 146, that can be located at various locations (e.g., within corporate network 130, within public cloud 140, or outside of corporate network 130 and public cloud 140). The access proxies, for example, may be located within a cloud or at an entry part to a secure network.

The access proxies 112, 134, 144, 146 may use an authentication module 116 to serve as access enforcement points to enforce the accesses policies based on user, device and application. The authentication module 116 can be a part of at least one of the access proxies 112, 134, 144, 146 as shown or can operate outside of the access proxies 112, 134, 144, 146. The authentication module 116 may identify a user, a user device and a specific application on the user device that is requesting access to the cloud resource within the network and can grant or limit access to this particular application. Other applications on the same device would not be able to access the internet access proxy or cloud resources within the network.

The wrapping of wrapped application 107 can include access credentials module 109, which uses access credentials to initiate an authenticated session with access proxy 112, 134, 144, 146. Access credentials module 109 can receive access credentials from a user, from a device, from an application, etc. Access credentials can include data that can be used to authenticate a user, a device, and an application, etc.

Figure 2:
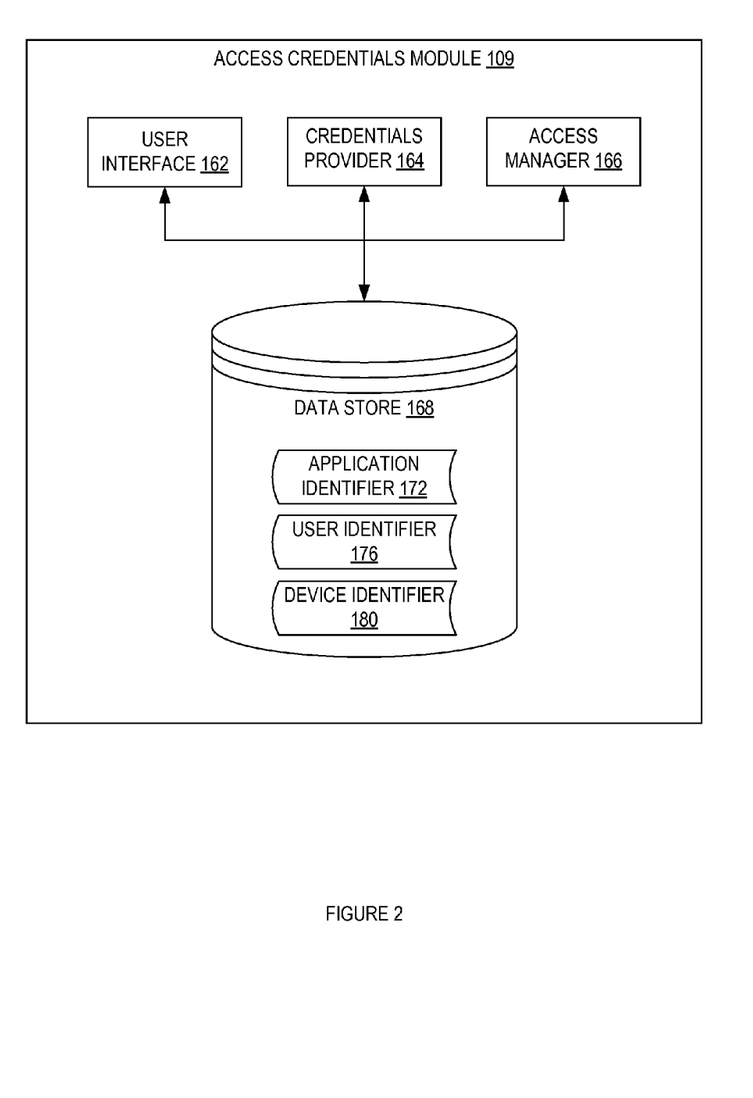
FIG. 2 is a block diagram illustrating an access control module, according to an embodiment.

One implementation of access credential module 109 is described in greater detail in conjunction with FIG. 2.

By using a software development kit (SDK), a wrapped application 107 can identify itself through a secure communication (e.g., cookies or other protocol independent method) to encode user, device and application information. When using a mobile application wrapper, the software SDK adds a secure communication layer when communicating with the access proxy. The SDK adds a secure and encrypted combination of user, device and application identifiers to pass to the access proxy for authentication.

In an example, a request to access a cloud resource, such as private cloud resource 132 or public cloud resource 142, may be passed through one of the access proxies. An authentication module 116 may compare a combination of access credentials associated with the request to a list or database of allowable users, devices, and applications, and enforce an action based on the result of the comparison. The action may include, for example, allowing the request, denying the request, authorizing the request, modifying the request, or some other action. The action can be to confirm that the user has the right to access the application, the device has permission to have the application installed, and the application itself is verified to be secure. Authentication module 116 can verify each of these access credentials before granting access to the network for that application. Authentication module 116 can provide instructions for granting, authorizing, denying or limiting the application access to the resource within the network of the organization.

In another example, a request to access a cloud resource may be passed through multiple access proxies to form a layered access enforcement scheme. Each access proxy in this layered approach can perform a different authentication or authorization task. A first access proxy can perform a first validation of a request to access the cloud resource. A second access proxy can then perform a second validation of the request. In one implementation, the second access proxy performs the second validation of the request according to additional criteria. The additional criteria can be rules for a number of requests allowed within a given time period, a time period during which requests are allowed (e.g., during normal business hours), a geographic location of the user device 102, and other forms of irregular or untrusted behavior.

All communicated requests, information and data can be encrypted using, for example, Advanced Encryption Standard (AES) in Cipher-block chaining (CBC) mode with a 256 bit key. Data can be encrypted in 512 blocks, for example, each having a random initialization vector (IV). The encryption key can be different for every wrapped application 107 on every user device 102. In one embodiment, the key used to encrypt the file and directory data is generated within the wrap code and does not leave user device 102. When persisted, encryption key is encrypted using AES-CBC and one or more 256 bit keys, known as a "KEKs", or key-encryption-keys. Cloud resources can also be encrypted. To access an encrypted cloud resource, a user device 102 can receive an encrypted key from access proxy 112, 134, 144, 146. The user device 102 decrypts the encrypted key and uses the key to access an encrypted cloud resource.

FIG. 2 is a block diagram of one embodiment of an access credential module 109 that is included in a wrapped application 107. Access credentials module 109 manages access credentials (e.g., application identifier, user identifier, device identifier, etc.). Access credentials module 109 can receive access credentials, store them, provide them to requesting modules, devices or systems and facilitate access to a cloud resource (e.g., private could resources 132 and/or public could resources 142) for application 107 on user device 102. The access credentials may be created or defined, for example, by a user, system administrator, a device, or other person or entity.

In one embodiment, access credential module 109 can include user interface 162, credentials provider 164 and access manager 166. In other embodiments, access credential module 109 can include more or fewer components. In one embodiment, access credential module 109 is connected to a data store 168, which may be a file system, database or other data management layer resident on a data storage device such as a disk drive, RAM, ROM, database, etc.

User interface 162 can be a graphical user interface (GUI) that is presented to the user of device 102 and can be presented when a user launches wrapped application 107. The user interface 162 can be a login screen to receive a user identifier (e.g., username, password) from a user. In one embodiment, the username can be pre-populated and can be the same username that was used for accessing the application store 110. User identifier 176 is concerned with the identity of the user making a request to access a cloud service and/or cloud information. In one embodiment, the user identifier is provided as part of a single sign-on (SSO). SSO is a property of access control of multiple related, but independent software systems (e.g., private cloud resources 132 and public cloud resources 142). With SSO, the user logs in once and gains access to all (or a certain subset) of the services without being prompted to log in again at each of them.

In one embodiment, the login credentials provided by the user may vary depending on the user status. For example, the user may have a certain user name or login if the user is a member of a first group, such as being an employee of the corporation that manages corporate network 130. If the user is not a member of the first group, the user may have a different set of login credentials, identifying the user as such. In addition, the login credentials may provide other information about the user, such as rank, title, position, or other information.

User interface 162 receives the user identifier 176 and stores it in data store 168. The user interface 162 can be invoked when the user launches the application 107 for the first time. Next time, when the application 107 is launched, the user identifier 176 can be obtained from the data store 168 or can be requested again via the user interface 162.

User interface 162 can also request the user to enter the device identifier 180. Alternatively, credentials provider 164 can determine the device identifier 180 by, for example, accessing device configuration information at a designated memory location. Credential provider 164 may obtain the device identifier 180 when the application 107 is launched for the first time, and store it in the data store 168.

In addition, when the application 107 is launched, credentials provider 164 determines an application identifier 172. Application identifier 172 can be a string of alphanumeric characters and symbols. Application identifier 172 may also be characterized by the type of resource requests it makes (e.g., read, write, delete) as well as a related service subdomain (e.g., the scope of the requested information). Application identifier 172 can be embedded in the wrapped application 107. Credential provider 164 may obtain the application identifier 172 when the application 107 is launched for the first time, and store it in the data store 168.

Credentials provider 164 sends access credentials (user identifier 176, device identifier 180 and application identifier 172) to an access proxy 112, 134, 144, 146 and can send the access credentials along with a request to access a cloud resource. Credentials provider 164 can send access credentials to the access proxy 112, 134, 144, 146 when the user requests to launch the application 108 or in response to a request for access credentials from the access proxy. Credentials provider 164 can use the SDK to encode and wrap the access credentials within a package that includes an authentication token (e.g., an XML-based signed assertion) to send to the access proxy 112, 134, 144, 146. A certificate authority can provide an application private key that can be used to digitally sign the authentication token. The application private key can be embedded with the wrapped app 107. Credentials provider 164 can then send the package with the access credentials to the access proxy 112, 134, 144, 146 through a secure communication (e.g., cookies or other protocol independent method).

Access manager 166 receives a response from the access proxy and communicates it to the application 108, which may then proceed with its request to access a specific resource or may display a message to the user that the access to the user, device and/or application that initiated the resource request is denied.

Figure 3:
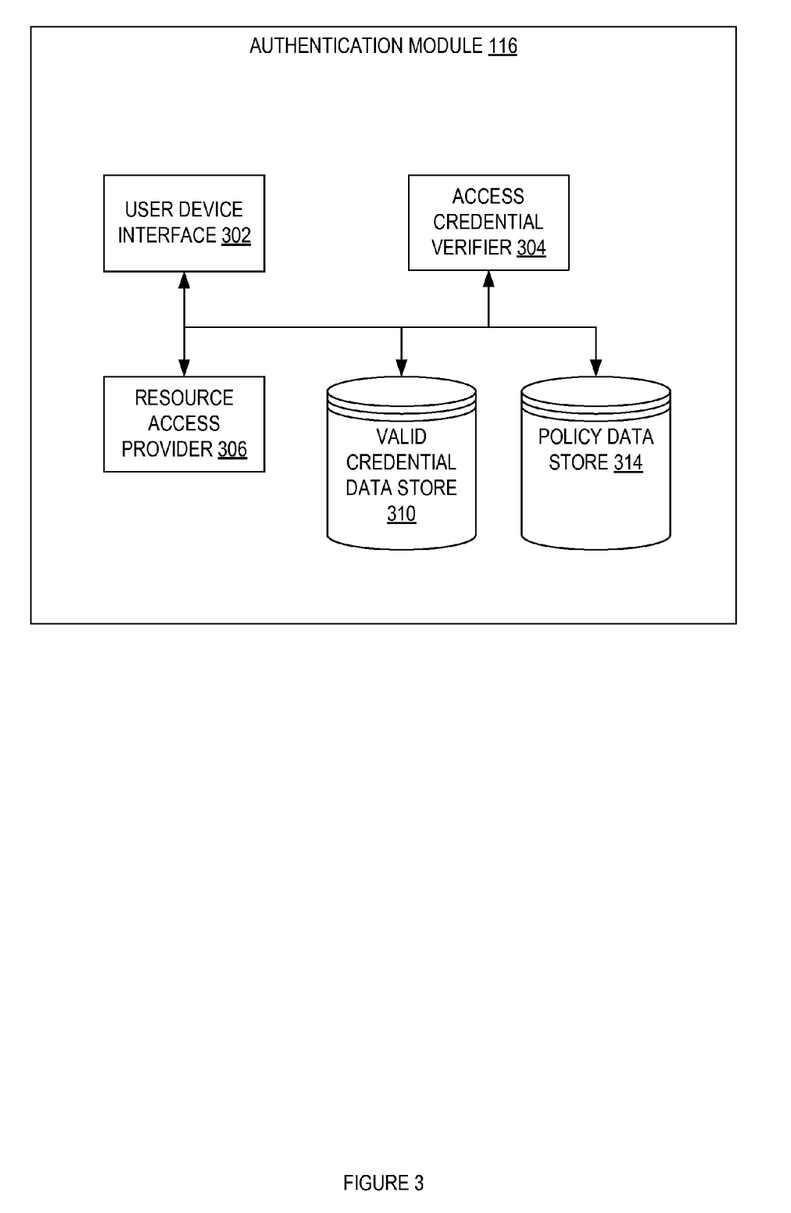
FIG. 3 is a block diagram illustrating an authentication module, according to an embodiment.

FIG. 3 is a block diagram illustrating an authentication module 116, according to an embodiment of the present invention. In one embodiment, authentication module 116 may include user device interface 302, access credential verifier 304, and resource access provider 306. Authentication module 116 may include more or fewer components. Authentication module 116 may be connected to valid credential data store 310 and/or policy data store 314, which may be file systems, databases or other data management layers resident on a data storage device such as a disk drive, RAM, ROM, database, etc.

Valid credential data store 310 may specify valid user identifiers, which may be identifiers of specific users (e.g., a user name and password) and/or user categories (e.g., an employee, a contractor, etc.). Valid credential data store 310 may also include a list of valid device identifiers and information on whether a corresponding device is a managed or unmanaged device. In addition, valid credential data store 310 may include a list of identifiers of secure applications and information on whether a corresponding application was provided by an application store of the corporation or a third party application store. Valid credential data store 310 may also store public keys of secure applications provided by an application provisioning service.

Policy data store 314 may store various access policies that define access permissions for cloud resources. For example, an access policy may require that a request for a private cloud resource from an unmanaged device and/or an application from a third party application store be verified with an application provisioning service that manages the respective application store to confirm that the user has the right to the application, the application is installed on the valid device that is requesting access, and the application itself is secure. In another example, an access policy may require that a request for a private cloud resource from an unmanaged device and/or an application from a third party application store be verified based on a list of valid combinations of user identifier, device identifier and application identifier, where such a list of valid combinations can be stored in the policy data store 314 or in the valid credential data store 310.

Authentication module 116 may intercept or otherwise receive an access request. The request may be sent, for example, by user device 102 to access a cloud resource, such as private cloud resource 132 or public cloud resource 142. In one embodiment, the request may include information about the requestor and/or other data, such as an identity of the user making the request (e.g., user identifier), information about an application related to the request (e.g., application identifier), information about the device from which the request was made (e.g., device identifier). Authentication module 116 may use this information to make an access determination according to one or more applicable access policies, such as a cloud resource security policy, which may be stored in policy data store 314.

User device interface 302 receives and transmits communications from and to user device 102. In one embodiment, user device interface 302 can receive a request to access a cloud resource and extract access credentials associated with the request. User device interface 302 can then relay the access credentials to access credential verifier 304. Access credential verifier 304 can examine the access credentials, determine which cloud resources are being requested, and find one or more applicable access policies. In one embodiment, verifier 304 identifies access credentials and may determine if the request should be allowed for a given cloud resource according to the applicable access policies in policy data store 314. For example, access credential verifier 304 may determine that the request is received from an employee of the corporation, and associated with a secure application on a valid user device, such as user device 102. The access policy may dictate that a request with that particular combination of access credentials should be allowed for either private cloud resources 132 or public cloud resources 142. In one embodiment, the resource security policy may specify individual cloud resources that may or may not be accessed, rather than just a class of resources.

In some embodiments, access credential verifier 304 can also identify a type of information that the access request is either sending to a cloud service or requesting from the cloud service. The information may be classified in any number of different ways, such as corporate or personal, confidential or public, critical or non-critical, etc. For example, access credential verifier 304 may determine that the user is attempting to download corporate sales data from a private cloud service 132, and use a respective access policy to determine whether this operation should be allowed or denied. Based on this determination, resource access provider 306 can grant, deny or limit access to the requested cloud resource.

Figure 4:
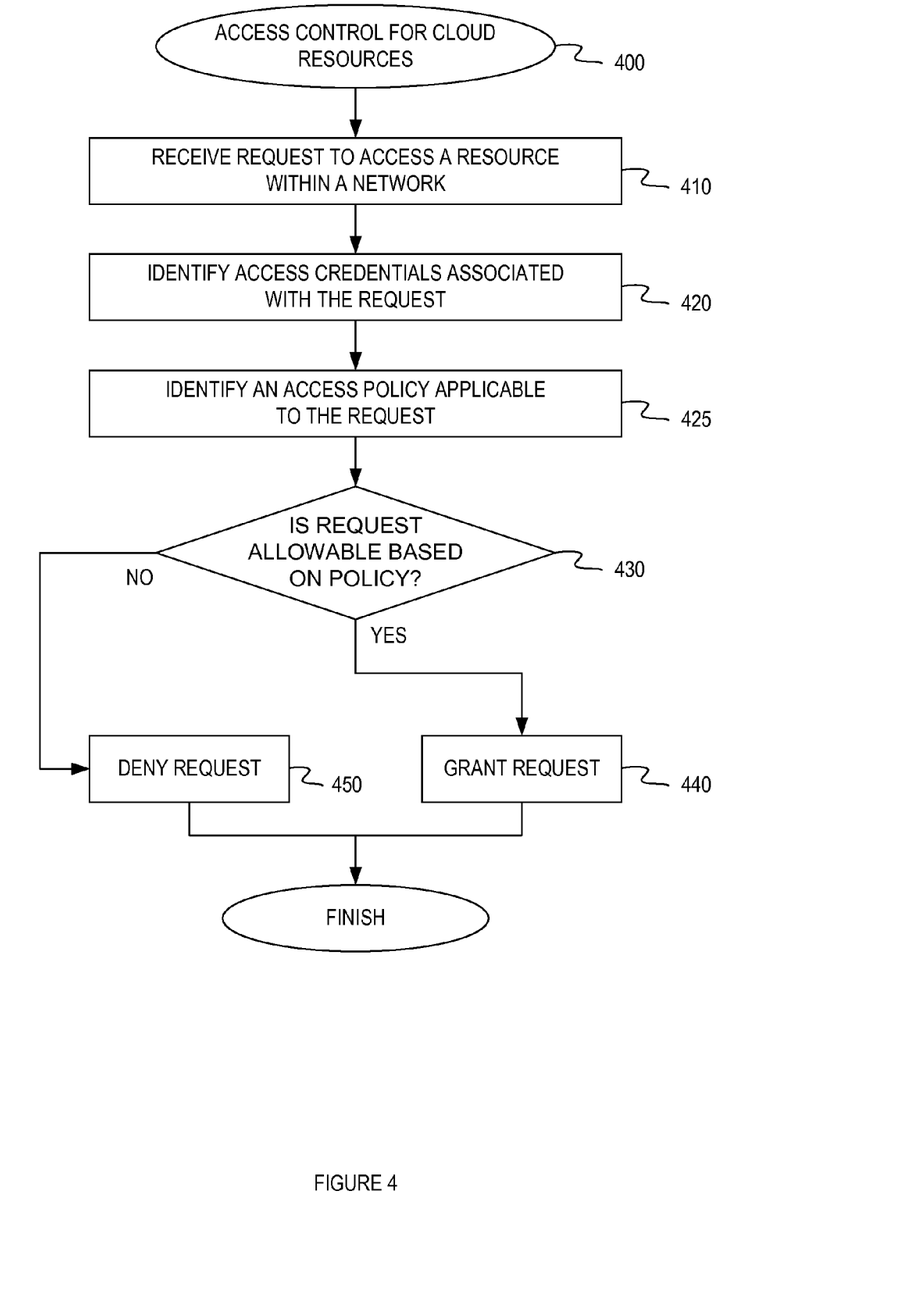
FIG. 4 is a flow diagram illustrating an access control method for cloud resources, according to an embodiment.

FIG. 4 is a flow diagram illustrating an access control method for cloud resources, according to an embodiment of the present invention. The method 400 may be performed by processing logic that comprises hardware (e.g., circuitry, dedicated logic, programmable logic, microcode, etc.), software (e.g., instructions run on a processor to perform hardware simulation), or a combination thereof. The processing logic is configured to monitor requests for access to cloud resources made by user devices. In one embodiment, method 400 may be performed by an access proxy (e.g., access proxy 112, 134, 144 or 146 of FIG. 1).

Referring to FIG. 4, at block 410, the access proxy receives a request to access cloud a resource within a network. In one embodiment, the request may be sent by a user device, such as user device 102. The request may be for access to a cloud resource, such as private cloud resource 132 or public cloud resource 142.

At block 420, the access proxy may identify access credentials associated with the request, such as an application identifier 172, a user identifier 176, and a device identifier 180. The access credentials can be wrapped within a package that includes an authentication token (e.g., an XML-based assertion signed by an application private key). The access proxy unwraps the package to extract the access credentials using an application public key received from an application provisioning service. At block 425, the access proxy identifies an access policy applicable to the request.

At block 430, the access proxy determines whether the request is allowable based on the received access credentials and the applicable access policy. The access proxy can use the authentication token to authenticate an application associated with the request. In one embodiment, the access proxy can also communicate with a corresponding application provisioning service to verify prior installation of a wrapped application 107 on a user device 102. In another embodiment, the access proxy passes the access credentials to a third party verification service, which determines whether the combination of the user identifier, the device identifier and the application identifier is valid, and reports it back to the access proxy.

If at block 430, the access proxy determines that the request is allowable based on the resource security policy, the access proxy determine which cloud resources should be made available to user device 102, and grants the request (block 440). Access proxy can transmit a response for the user device 102 that the request is allowed. The response can include a unique encrypted key, such as a KEK, for the wrapped application 107 and the user device 102. The requesting user device 102 can access the cloud resource or information.

Granting the request at block 440 can also include restricting access (e.g., through an access policy) to a limited set of resources based on the combination of received access credentials. In one embodiment, the combination of received access credentials is associated with specific cloud resources (e.g., a database, a document, etc.) to limit access of the combination of the application, the user device and the user to those specific cloud resources. For example, a company can have two employees, each using the same application to access corporate cloud resources. The first employee may work in the HR department and can have access to HR-related cloud resources. The second employee may be part of the patent group and can have access to patent-related cloud resources. The access proxy may use an access policy that allows the HR employee to access patent-related cloud resources and prevents the patent employee from accessing HR-related cloud resources. In another example, an application started by a user on a user device may first request names of employees working in the HR department, and be allowed access to an employee name table in an employee database in a private cloud. Then, the application may request salaries of the employees working in the HR department, and be denied access to an employee salary table in the employee database in the private cloud.

If the request is not allowable (e.g., the access policy specifies that a request with the specified combination of access credentials should not be allowed to access private cloud resources 132), the access proxy denies the request and informs the requester that the request is denied (block 450).

Figure 5:
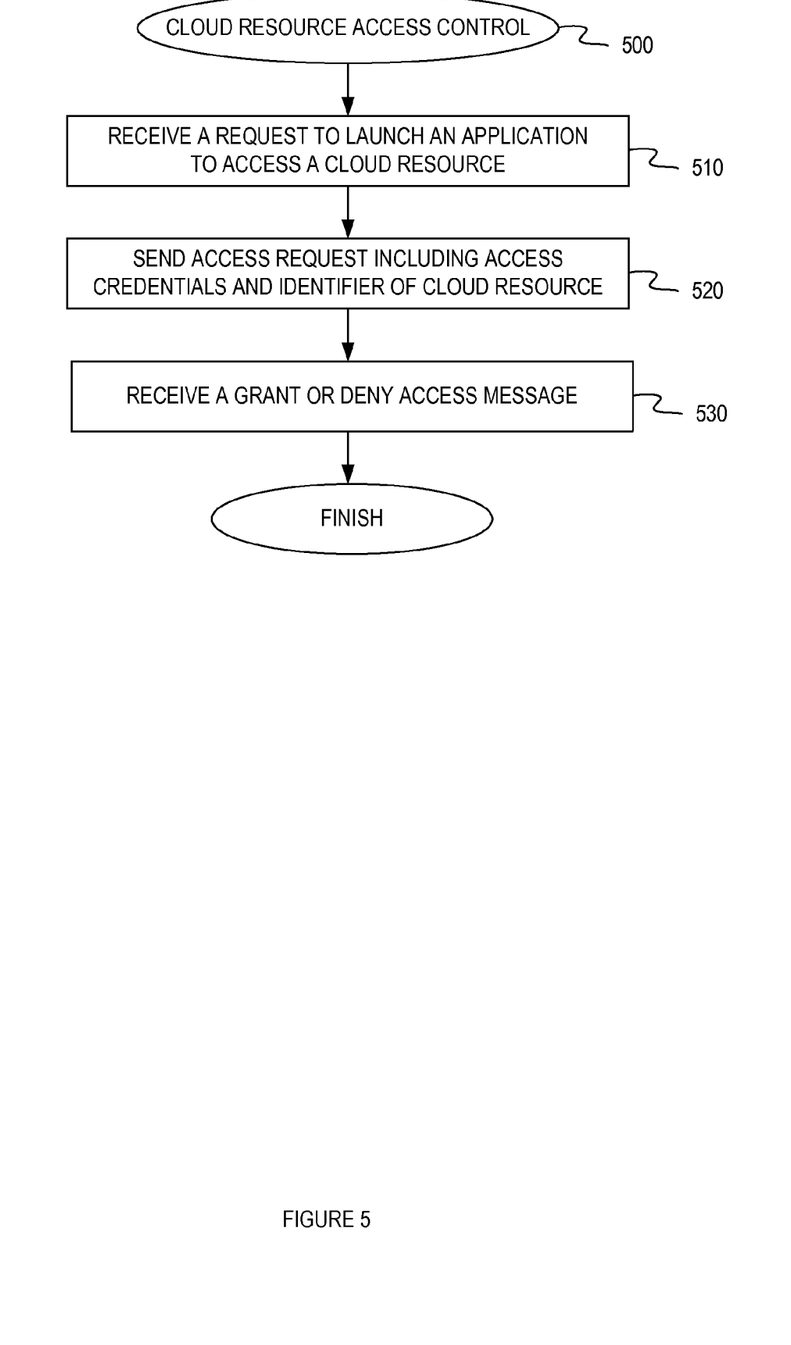
FIG. 5 is a flow diagram illustrating an access control method for cloud resources, according to another embodiment.

FIG. 5 is a flow diagram illustrating a cloud resource access control method 500 for cloud services, according to an embodiment of the present invention. The method 500 may be performed by processing logic that comprises hardware (e.g., circuitry, dedicated logic, programmable logic, microcode, etc.), software (e.g., instructions run on a processor to perform hardware simulation), or a combination thereof. The processing logic is configured to monitor and control access to cloud resources on a user device. In one embodiment, method 500 may be performed by user device 102 of FIG. 1.

Referring to FIG. 5, at block 510, the user device receives a user request to launch an application whose operation involves accessing a cloud resource. In response, the user device obtains access credentials that can include a user identifier, a device identifier, and an application identifier.

At block, 520, the user device may send an access request including the access credentials and the identifier of the cloud resource to a cloud or an access proxy via a network. At block 530, the user device can receive a message from the access proxy indicating whether the access to the cloud resource is granted, denied, or limited to a limited set of resources, and may communicate this information to the application.

Figure 6:
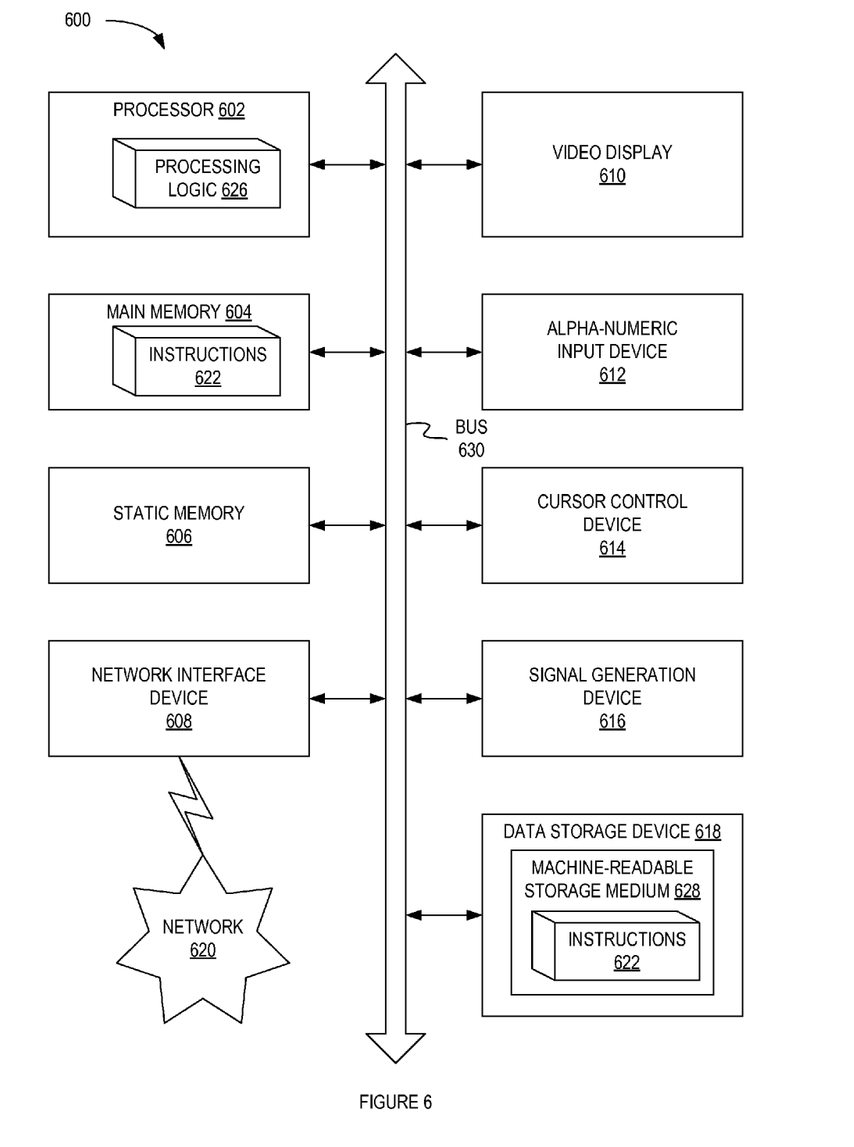
FIG. 6 is a block diagram illustrating one embodiment of a computer system, according to an embodiment.

FIG. 6 illustrates a diagrammatic representation of a machine in the example form of a computer system 600 within which a set of instructions, for causing the machine to perform any one or more of the methodologies discussed herein, may be executed. The system 600 may be in the form of a computer system, such as a server computer system, within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a mobile device, a tablet, a smartphone, a TV, a laptop computer, a netbook, a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 600 may represent access proxies 112, 134, 144, 146 in FIG. 1, or user device 102 in FIG. 1.

The example computer system 600 includes a processing system (processor) 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 618, which communicate with each other via a bus 630.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 may be configured to execute the access proxies 112, 134, 144, 146 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a computer-readable medium 628 on which is stored one or more sets of instructions 622 (e.g., instructions of access proxies 112, 134, 144, 146) embodying any one or more of the methodologies or functions described herein. The instructions 622 may also reside, completely or at least partially, within the main memory 604 and/or within processing logic 626 of the processor 602 during execution thereof by the computer system 600, the main memory 604 and the processor 602 also constituting computer-readable media. The instructions may further be transmitted or received over a network 620 via the network interface device 608.

While the computer-readable storage medium 628 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

The present description sets forth numerous specific details such as examples of specific systems, components, methods, and so forth, to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "identifying", "adding", "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions. The computer readable storage medium can be non-transitory.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
receiving a request of an application to access a resource within a network of an organization, wherein the application is running on a user device outside of the network of the organization;
identifying a user identifier of a user of the application, a device identifier of the user device, an application identifier of the application, and an authentication token, wherein the user identifier, the device identifier, the application identifier and the authentication token are each associated with the request;
determining, by a processor, whether a combination of the user identifier, the device identifier, the application identifier and the authentication token satisfies an access policy; and
granting the application access to the resource within the network of the organization if the combination of the user identifier, the device identifier, the application identifier and the authentication token satisfies the access policy.

2. The method of claim 1 wherein the resource is at least one of a private cloud resource or a public cloud resource.

3. The method of claim 1, wherein the request of the application comprises the user identifier, the device identifier, the application identifier, and the authentication token contained in an assertion signed by an application private key.

4. The method of claim 3 further comprising:
extracting the user identifier, the device identifier, the application identifier, and the authentication token from the request using an application public key from an application provisioning service.

5. The method of claim 1, wherein granting the application access to the resource within the network of the organization comprises:
determining which cloud resources to make available to user device; and
restricting access of the user device to the determined cloud resources.

6. The method of claim 1, wherein determining whether the combination of the user identifier, the device identifier, the application identifier and the authentication token satisfies the access policy comprises comparing the combination of the user identifier, the device identifier and the application identifier associated with the request to a list of valid combinations of user identifiers, device identifiers, and application identifiers.

7. A system, comprising:
an access proxy having a memory, and a processor, coupled with the memory, to:
receive a request of an application to access a resource within a network of an organization, wherein the application is running on a user device outside of the network of the organization;
identify a user identifier of a user of the application, a device identifier of the user device, an application identifier of the application, and an authentication token, wherein the user identifier, the device identifier, the application identifier and the authentication token are each associated with the request;
determine whether a combination of the user identifier, the device identifier, the application identifier and the authentication token satisfies an access policy; and
grant the application access to the resource within the network of the organization if the combination of the user identifier, the device identifier, the application identifier and the authentication token satisfies the access policy.

8. The system of claim 7, wherein the resource is at least one of a private cloud resource or a public cloud resource.

9. The system of claim 7, wherein the request of the application comprises the user identifier, the device identifier, the application identifier, and the authentication token contained in an assertion signed by an application private key.

10. The system of claim 9 the processor further to extract the user identifier, the device identifier, the application identifier, and the authentication token from the request using an application public key from an application provisioning service.

11. The system of claim 7, wherein granting the application access to the resource within the network of the organization comprises:
determining which cloud resources to make available to user device; and
restricting access of the user device to the determined cloud resources.

12. The system of claim 7, wherein determining whether the combination of the user identifier, the device identifier, the application identifier and the authentication token satisfies the access policy comprises comparing the combination of the user identifier, the device identifier and the application identifier associated with the request to a list of valid combinations of user identifiers, device identifiers, and application identifiers.

13. The system of claim 7, further comprising:
a user device to:
receive a user request to launch an application to access a cloud resource;
obtain access credentials for the application, the access credentials comprising the user identifier, the device identifier, and the application identifier;
send an access request that comprises the access credentials, the authentication token, and an identifier of the cloud resource to the access proxy via a network; and
receive a response to the access request from the access proxy, the response indicating whether the access request has been granted or denied.

14. The system of claim 13 wherein obtaining access credentials comprises providing a user interface to facilitate user input of at least one of the user identifier, the device identifier and the application identifier.

15. The system of claim 13, wherein the access request is an assertion signed by an application private key.

16. A non-transitory computer readable storage medium including instructions that, when executed by a processor, cause the processor to perform operations comprising:
receiving a user request to launch an application to access a cloud resource;
obtaining access credentials for the application, the access credentials comprising a user identifier, a device identifier, and an application identifier;
sending an access request that comprises the access credentials, an authentication token, and an identifier of the cloud resource to an access proxy via a network; and
receiving a response to the access request from the access proxy, the response indicating whether the access request has been granted or denied.

17. The non-transitory computer readable storage medium of claim 16, wherein obtaining access credentials comprises providing a user interface to facilitate user input of at least one of the user identifier, the device identifier and the application identifier.

18. The non-transitory computer readable storage medium of claim 16, the operations further comprising:
receiving the authentication token from the access proxy, wherein the authentication token comprises an encrypted key;
the encrypted key; and
accessing an encrypted cloud resource using the key.

19. The non-transitory computer readable storage medium of claim 16, wherein the resource is at least one of a private cloud resource or a public cloud resource.

20. The non-transitory computer readable storage medium of claim 16, wherein the access request is an assertion signed by an application private key.

* * * * *